Figure 1:
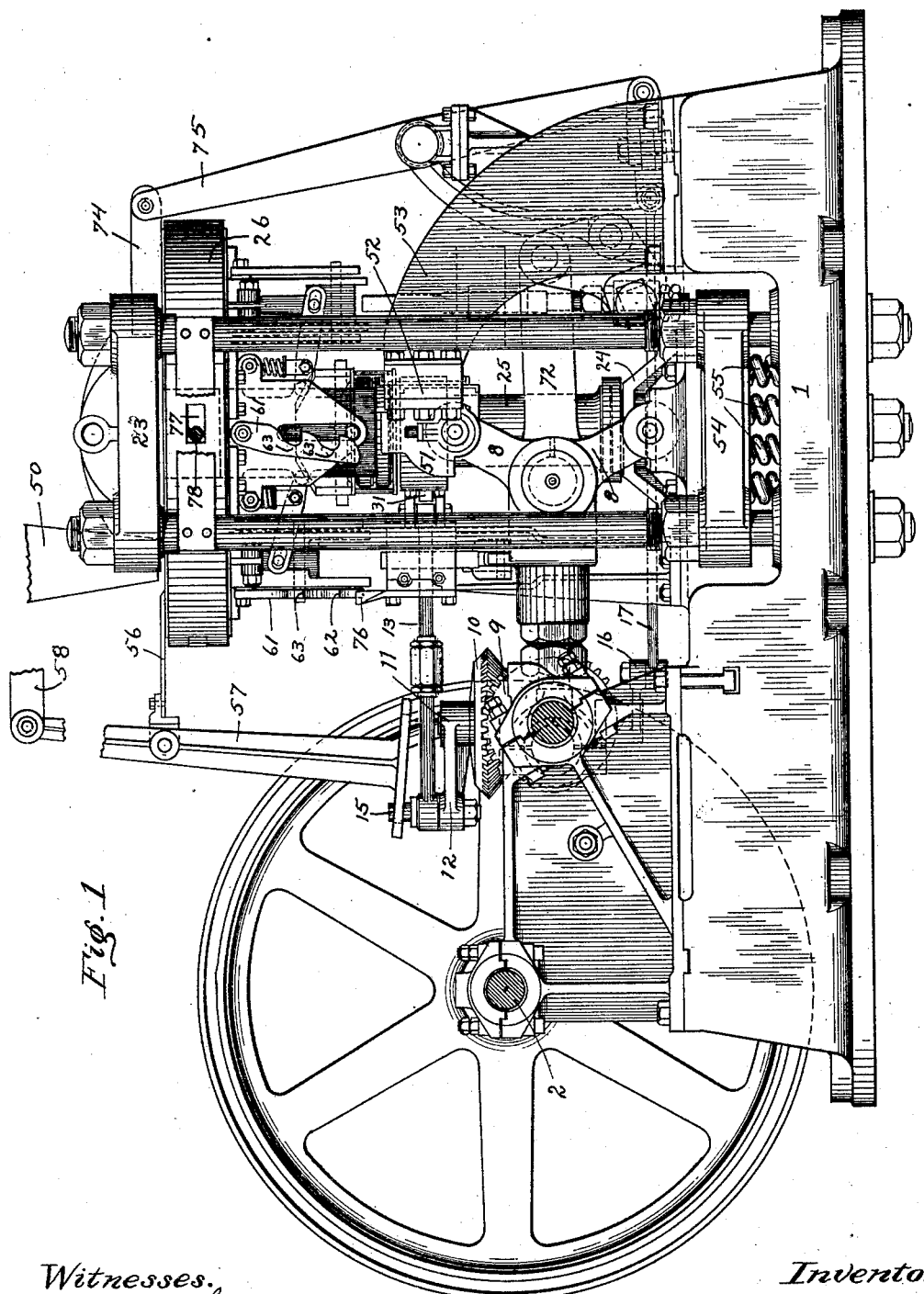

No. 716,461. Patented Dec. 23, 1902.
W. C. McELHENY.
BRICK MACHINE.
(Application filed Nov. 23, 1901.)

(No Model.) 6 Sheets—Sheet 1.

Witnesses. Inventor:

No. 716,461. Patented Dec. 23, 1902.
W. C. McELHENY.
BRICK MACHINE.
(Application filed Nov. 23, 1901.)
(No Model.) 6 Sheets—Sheet 2.

Witnesses.
Inventor:
Attorneys.

No. 716,461. Patented Dec. 23, 1902.
W. C. McELHENY.
BRICK MACHINE.
(Application filed Nov. 23, 1901.)
(No Model.) 6 Sheets—Sheet 3.
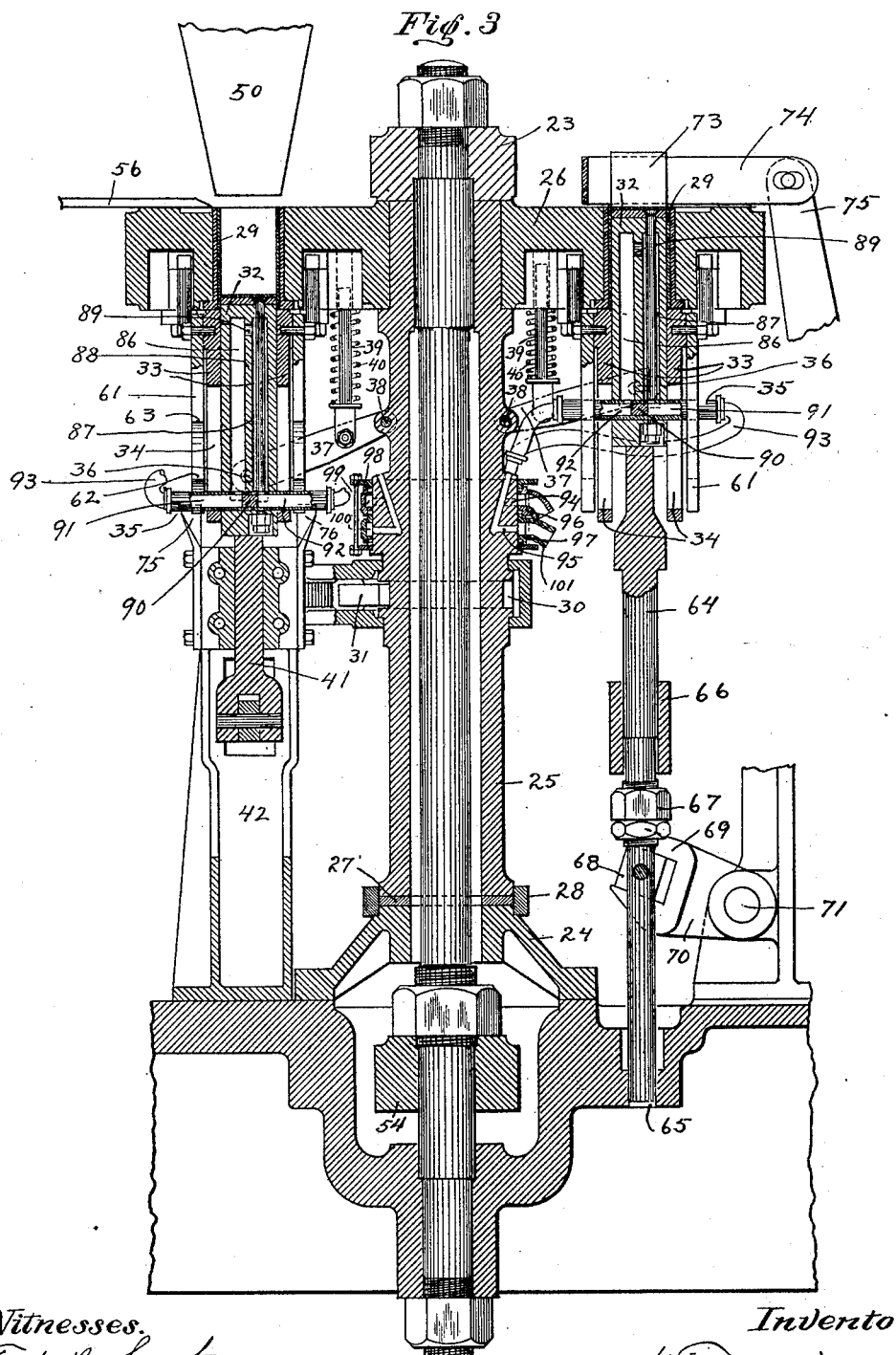

No. 716,461. Patented Dec. 23, 1902.
W. C. McELHENY.
BRICK MACHINE.
(Application filed Nov. 23, 1901.)
(No Model.) 6 Sheets—Sheet 4.
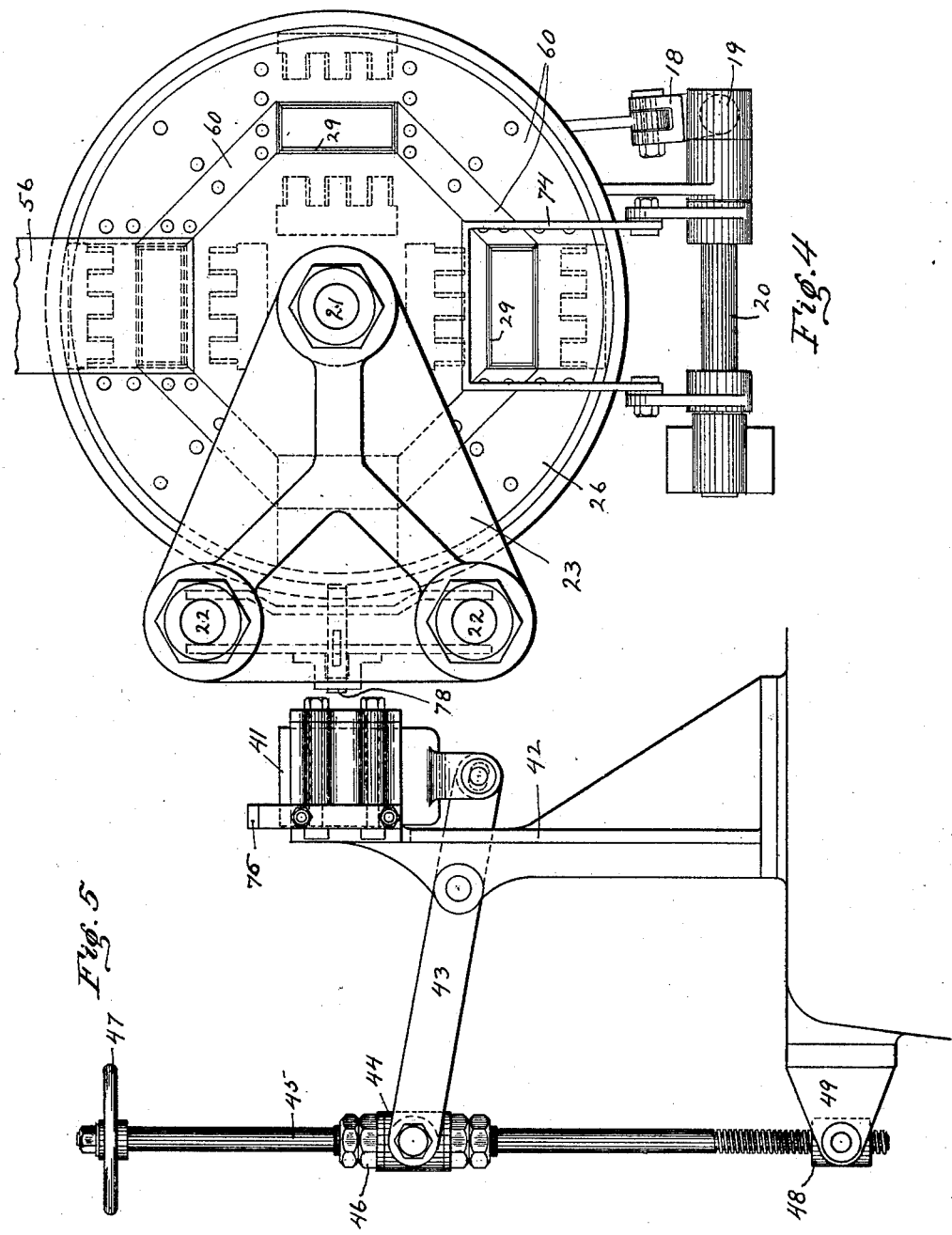
Witnesses.
Inventor.

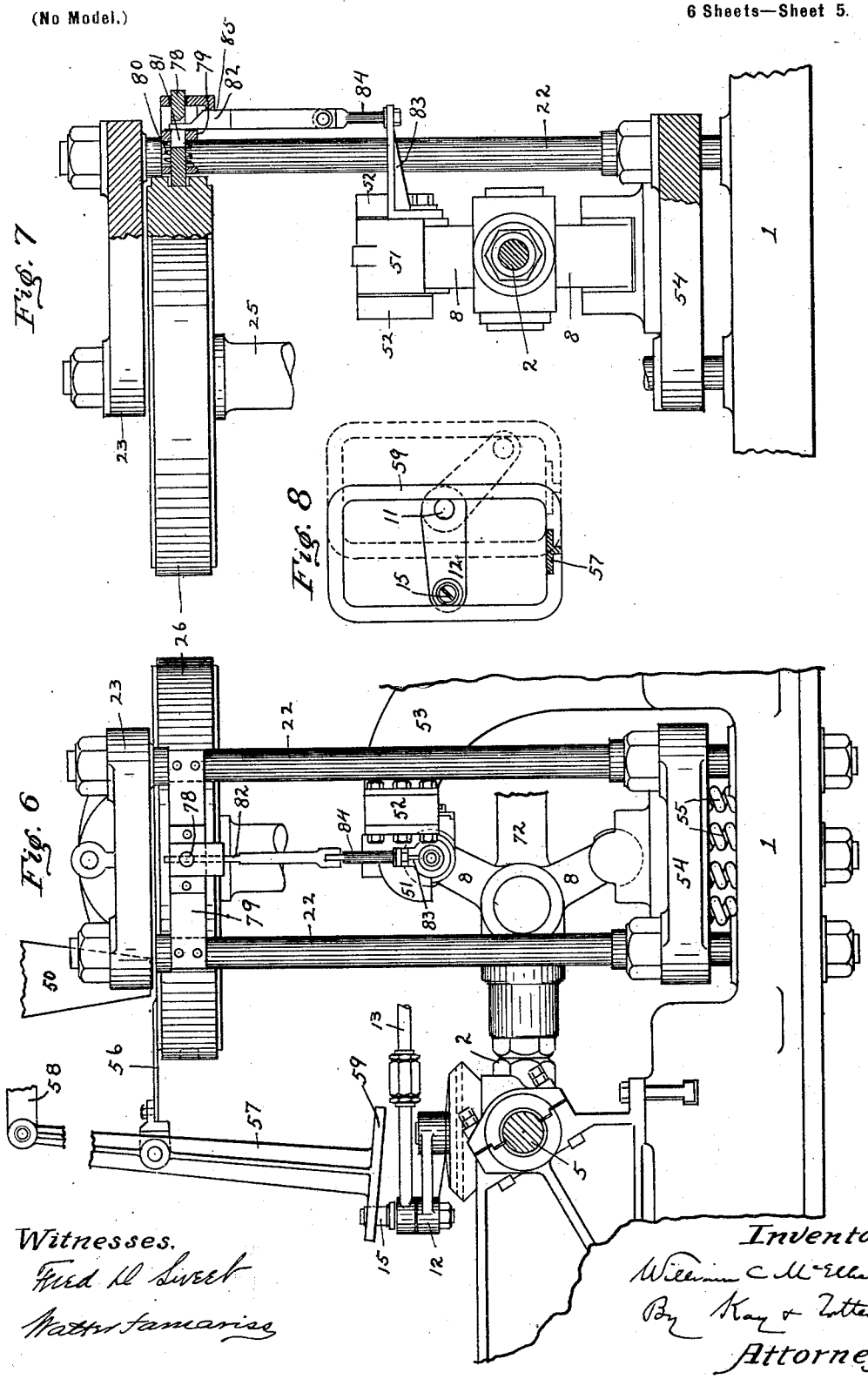

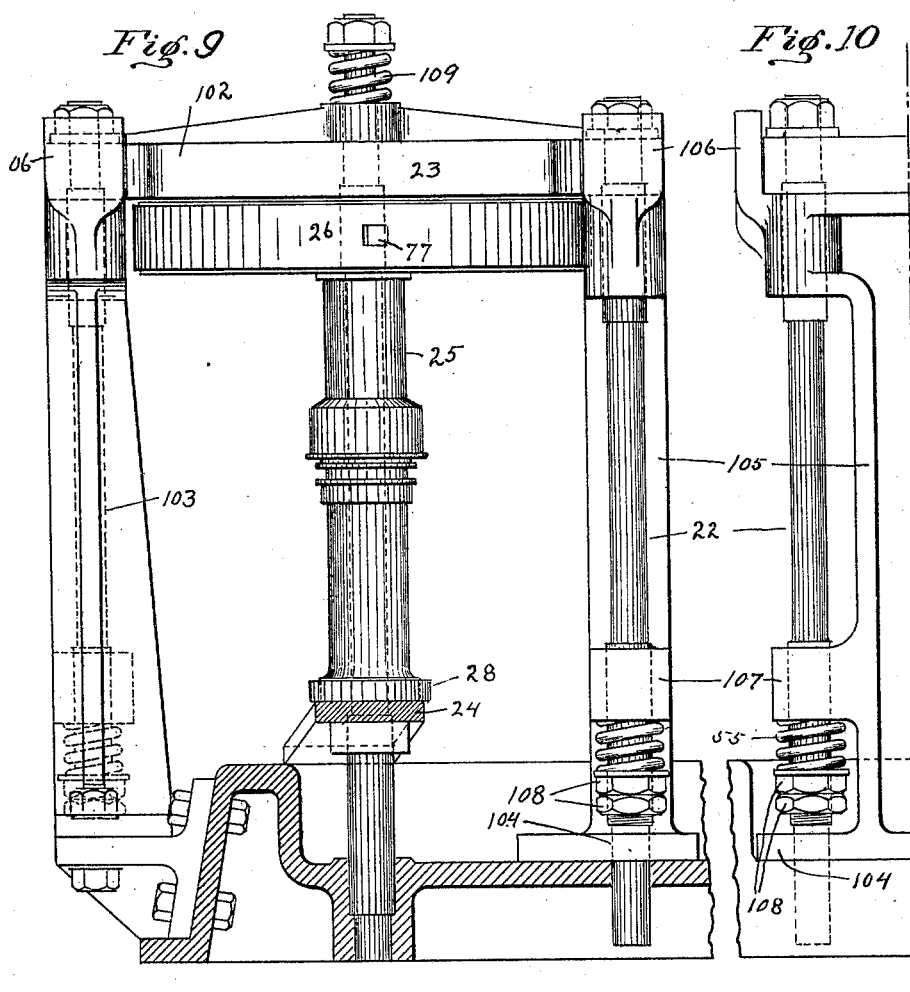
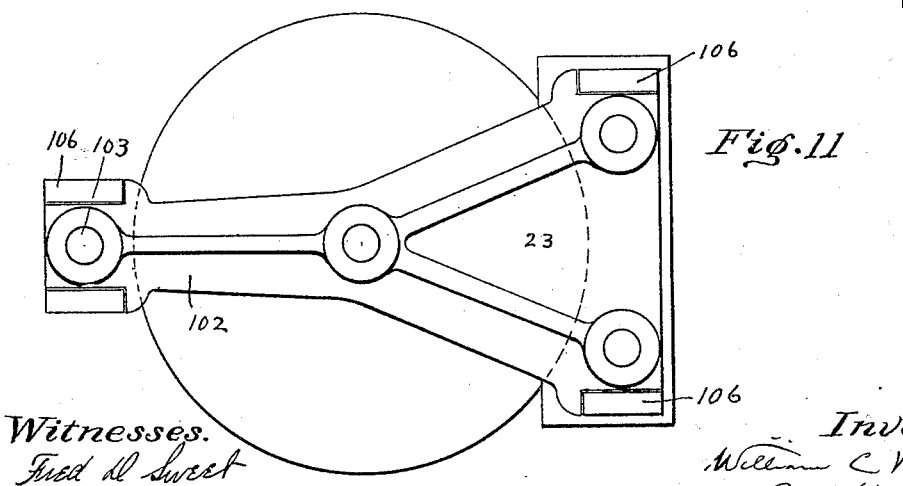

UNITED STATES PATENT OFFICE.

WILLIAM C. McELHENY, OF PITTSBURG, PENNSYLVANIA.

BRICK-MACHINE.

SPECIFICATION forming part of Letters Patent No. 716,461, dated December 23, 1902.

Application filed November 23, 1901. Serial No. 83,363. (No model.)

*To all whom it may concern:*

Be it known that I, WILLIAM C. MCELHENY, a resident of Pittsburg, in the county of Allegheny and State of Pennsylvania, have invented a new and useful Improvement in Brick-Machines; and I do hereby declare the following to be a full, clear, and exact description thereof.

My invention relates to brick molding and pressing machines and the like, and more especially to automatic machines of the type having a rotating table which carries a series of molds.

The objects of my invention are to provide a machine of this kind with yielding means, which will prevent breakage in case too much material is fed into the molds or a hard object is contained therein; to simplify the means for rotating the table and the means for actuating the indexing means for the rotating table; to provide a push-out rod; to provide improved means for regulating the amount of material fed to the molds; to provide an improved cut-off for the material being fed to the molds; to provide means for retracting the mold-plungers in case they should stick and to support said plungers until they reach the place where the molds are to be filled and then release the same, and to provide means for heating the mold-plungers, so as to prevent the clay or other material from sticking to the same.

Throughout the following specification I shall refer to my machine as a "brick-making" machine; but it is adapted for molding any kind of articles from clay or other plastic material—such as large-sized building and paving blocks, tiles, or similar articles—and it will be understood that the invention may be applied to any of these uses.

One type of automatic brick-molding machine as now constructed is provided with a horizontal rotating table carrying a series of molds having plungers working therein. These machines are provided with a pressure-plate adjacent to one side of the rotating mold table or plate and on the opposite side of the table with toggle-links, which force the plungers into the molds and compress the brick or other article against the resistance of the pressure-plate. Should too much material be fed to a mold or should a hard substance find its way into a mold, there is liability of breaking some part of the machine. One of the objects of my invention is to avoid this difficulty and to provide means which will yield in such cases, and thus avoid breaking the machine. Preferably such yielding means comprises a strong spiral spring or springs between the bed-plate and a bolster, to which the lower end of the toggle-links is connected. In this type of machine it is usual to mount the rotating table on a vertical shaft, which is provided with ratchet-teeth, and to pivot around said shaft a ratchet-lever for intermittently rotating the shaft and mold table or plate. It is also the practice to have a horizontal shaft having a crank or eccentric connected by a rod to the toggle-links, another crank or eccentric connected by a rod to the ratchet-lever, and a third eccentric or crank connected by a rod to suitable levers for actuating a push-out plunger—that is, the plunger for ejecting the brick or other article from the mold. This results in fairly-complicated mechanism, and especially the connection between the horizontal shaft and the ratchet-lever is a cumbersome one by reason of the crank of the shaft rotating in a vertical plane, while the ratchet-lever swings in a horizontal plane. This makes it necessary to provide the connecting means with several universal couplings or joints, which soon become loose, so that considerable lost motion results. This is detrimental, because the mold-table should be stepped forward accurately at each movement.

Another object of my invention is to simplify this mechanism, and to this end I actuate the push-out rod directly from the toggle-links which actuate the main plunger, thus omitting one of the connections to the main drive-shaft. I also actuate the ratchet-lever from a vertical shaft instead of from the main shaft itself, thereby permitting the use of a rigid connecting-rod between the eccentric or crank on the shaft and the ratchet-lever. This gives more positive connection and one which is not so liable to wear and result in lost motion. As a consequence the mold-table will be moved accurately into position under the feeding-spout. To prevent the table being accidentally moved out of proper position, I provide an indexing-bolt or similar means, which will lock the table in place while the molds are being filled and the bricks pressed and ejected. In machines of this character the mold-plungers work in a horizontal direction, and they are permitted to drop by gravity or else are pulled down by a hook or latch connected to the push-out plunger. In the former case they are liable to stick and in the latter case the mechanism is very unreliable. I provide suitable spring mechanism for this purpose which is not open to either of the above defects. Furthermore, in former machines of this type these mold-plungers were either drawn down or permitted to drop as soon as the brick or other article was ejected. Inasmuch as they must be permitted a downward movement equal to the largest-sized brick or block to be molded, it follows that for smaller sizes they must again be raised before the clay or other material is fed into the mold. This has led to much inconvenience.

Another object of my invention is to overcome this inconvenience, and to this end I provide a latch or latches for each mold-plunger, which is or are adapted to engage the plunger or projections thereon and hold the same in elevated position until the plunger has reached the position where the mold is to be filled, when the latches are automatically knocked off and the plunger allowed to drop upon an adjustable abutment, which determines the amount of material which can be fed into the mold, and consequently the sizes of the articles to be molded. I also provide improved means for adjusting this abutment, which means are simple, positive, and easily accessible. I also provide means for cutting off the supply of material to the molds when they are filled, so that in the rotation of the table the clay or other material will not bear thereon, thus relieving it of friction. As soon, however, as an empty mold is brought under the feeding-spout the cut-off is withdrawn to prevent the filling of the mold.

In brick-molding machines and the like there is danger of the clay or other material sticking to the molds or plungers, so that the molded article cannot be ejected cleanly and in perfect condition, thus resulting in a damaged article.

A further object of my invention is to overcome this defect, and to this end I provide means for heating the molds and plungers, which I find will prevent the clay or other material adhering thereto. This heating may be done by any hot fluid—such as steam, hot air, or hot gas—and preferably I conduct the hot fluid through the plunger, thereby directly heating the latter and heating the adjacent mold parts by radiation and direct contact with the plungers.

My invention further comprises improvements in details of construction of machines of this character, as will hereinafter be fully set forth.

Figure 2:
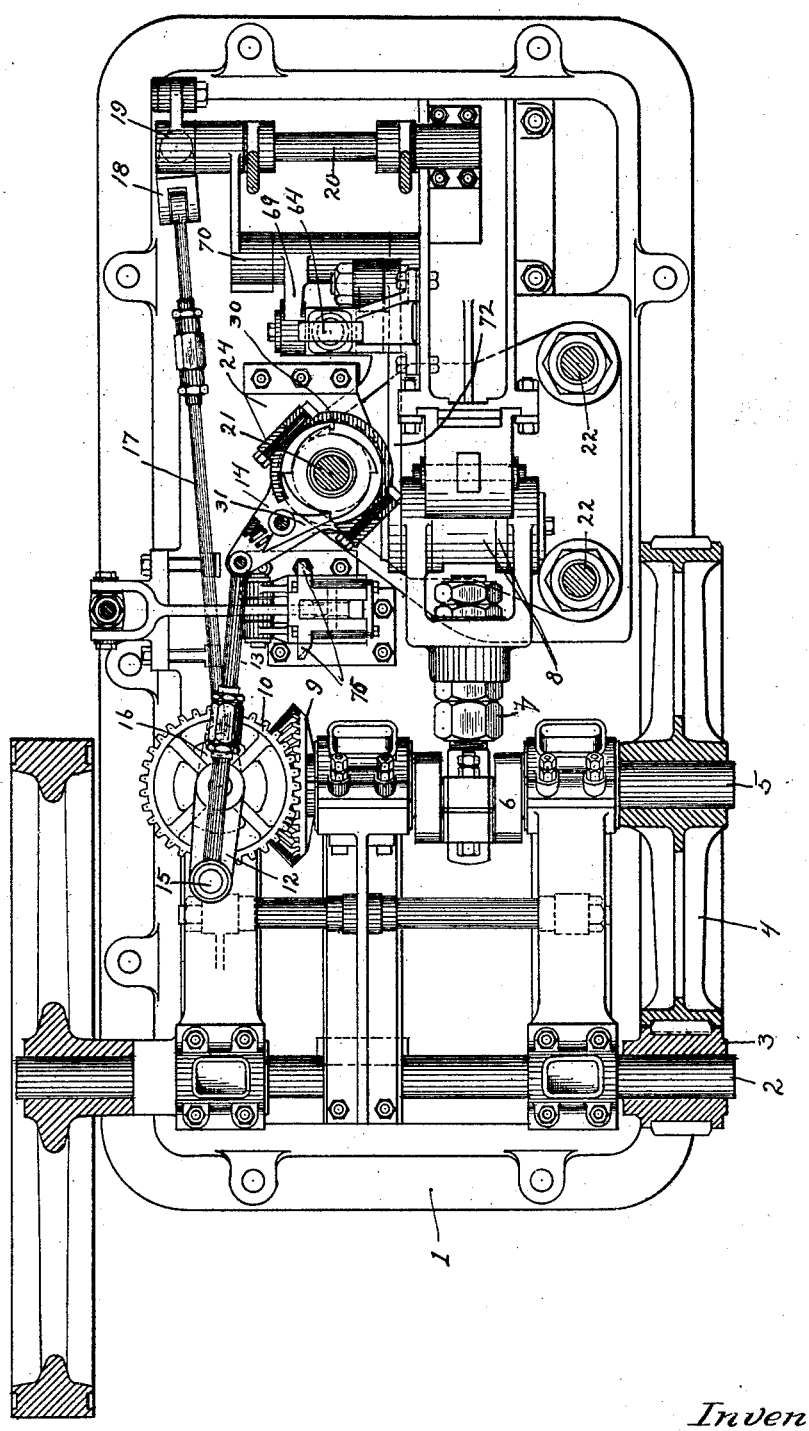

In the accompanying drawings, Figure 1 is a side elevation of my improved machine, parts being broken away. Fig. 2 is a plan view of the same, the pressure-plate and mold-carrying plate or table being removed. Fig. 3 is a vertical section through the main part of the machine. Fig. 4 is a top plan view of the machine, the driving parts being omitted. Fig. 5 is a detail elevation of the means for adjusting the feed-regulating abutment. Fig. 6 is a side elevation illustrating the indexing means and cut-off, other parts being omitted. Fig. 7 is a sectional detail showing the indexing means. Fig. 8 is a detail plan view of the stirrup for actuating the cut-off. Fig. 9 is a side elevation, partly in section, showing a modification. Fig. 10 is another side view of the same, and Fig. 11 is a top plan view of the same.

The machine is of the vertical type, and it may be mounted upon any suitable table or base-plate, such as the base-plate 1, and may have power communicated to it in any suitable way. As shown in the drawings, power is communicated to the main drive-shaft 2, which is mounted in a horizontal position at one end of the machine and is connected by a pinion 3 to a spur-gear 4 on the main crank-shaft 5, mounted in suitable housings at the same end of the machine and also in a horizontal position. This shaft is provided with a crank or eccentric 6, which is connected by a rod 7 with the toggle-links 8 for actuating the main plunger of the machine, as will hereinafter more fully appear. On the opposite end of the shaft 5 is a bevel-gear 9, meshing with a similar gear 10 on the vertical shaft 11. This shaft is provided at both ends with a crank, the crank 12 at the upper end being connected by the rod 13 to the outer end of the ratchet-lever 14 for intermittently rotating the mold table or plate, and the crank-pin is extended, as at 15, and actuates the cut-off, as will hereinafter more fully appear. The crank 16 at the lower end of the shaft 11 is connected by a rod 17 and universal coupling-link 18 to an arm 19 on a rock-shaft 20, mounted in suitable bearings at the opposite end of the machine, which rock-shaft actuates the rake-off or discharge mechanism, as will hereinafter more fully appear. The parts thus far described constitute the driving means for all parts of the machine.

Rising from the base-plate at the central part of the machine are three vertical standards or columns 21 22 22, which are united at their upper end by the pressure-plate 23, which, preferably, is of triangular form, as shown, so as to occupy a minimum of space. Surrounding the central standard 21 and secured to the base-plate 1 is a foot or step 24, and revolubly supported upon the same around the said standard 21 is a hollow column or sleeve 25, which carries at its upper end the mold plate or table 26. A wearing-washer 27 is preferably interposed between the lower end of the sleeve 25 and step 24, or, if preferred, any suitable antifriction-bearings may be used in this place. These parts are preferably inclosed by a ring or band 28 to exclude dirt.

The mold-carrying table 26 is shown circular in outline and secured to the upper end of the sleeve 25, so that it will revolve immediately below the pressure-plate 23. This table is provided with a series of openings in which are secured lining-plates 29, which form the molds. As many of these molds may be mounted in the table 26 as convenient or desired, four being shown in the accompanying drawings. The sleeve 25 is provided near its middle with ratchet-teeth 30, as many teeth being formed thereon as there are molds in the table 26, four such teeth being shown in the drawings. The ratchet-lever 14, above mentioned, is pivotally mounted around this sleeve 25, as by engaging annular shoulders on said sleeve. The lever is preferably hollow, as shown, to exclude dirt, and it carries a spring-pressed pawl 31, which is adapted to alternately engage the ratchet-teeth and to slide over the same when the said lever is actuated by means of the connecting-rod and crank 12, as will be readily understood. It will be observed that by having the crank 12 on a vertical shaft it will rotate in the same plane in which the lever 14 oscillates, so that a rigid connecting-rod 13 can be employed. As a consequence there is very little wear and no lost motion, which insures the table 26 being always stepped forward positively and to just the right point.

Working in each of the molds 29 is a plunger 32, and depending from the lower sides of the table 26 on opposite sides of the mold-opening are brackets 33, which are provided with vertical slots 34, in which slide pins 35, connected to the plungers 32 for guiding the latter and limiting the downward movement thereof. On the two opposite sides of the plungers 32 are the projecting pins or studs 36, which engage slotted openings in the outer ends of levers 37, pivoted at 38 to the standard or sleeve 25 and having connected thereto the vertical rods 39. Stiff spiral springs 40 are interposed between shoulders on the rods 39 and the lower side of the table 26, which springs, through the levers 37 and pins 36, will act to positively retract the plungers 32, so that the latter cannot stick in the molds.

The molds are filled when on the side of the machine toward the main driving-shaft, which is toward the left hand in Figs. 1, 2, and 3. The plungers 32 in this position of the machine are in their lowered positions, and to regulate the amount of material which can be fed into the molds the said plungers rest upon an adjustable abutment 41, which is slidably mounted in a suitable standard 42, rising from the bed-plate. Various means for adjusting this abutment may be employed; and I have shown for this purpose a lever 43, pivoted to the standard 42 and having a slotted connection at its inner end with suitable lugs or ears on the lower end of the abutment 41. Pivoted or trunnioned to the outer end of the lever 43 or between a fork formed thereon is a sleeve 44, through which passes loosely the adjusting-rod 45, said rod being provided with suitable collars, such as the nuts 46, which engage the top and bottom of the sleeve 44. This rod is provided at its upper end with a hand-wheel 47 or other suitable means for turning the same and has its lower end screw-threaded and working in a nut 48, which is pivoted or trunnioned in a suitable bracket 49, secured to the base-plate. By turning the hand-wheel 47 the rod 45 will work either up or down in the nut 48, thereby vibrating the lever 43 and elevating or lowering the abutment 41, as the case may be. The trunnioned nut 48 will swing and accommodate itself to the oscillation of the lever 43, as will be readily understood.

The clay or other material will be fed to the molds when in the position just described by any suitable means—such, for instance, as by a hopper or spout 50, placed with its discharge-mouth directly above the table 26. The table will be at rest while the mold is being filled and will thereafter, by means of the ratchet and mechanism described, be moved a step forward, thereby bringing another empty mold underneath the spout or hopper 50 and carrying the filled mold, with its plunger, underneath the pressure-plate 23 and with the plunger 32 in line with the toggle-links 8. The upper toggle-link is pivotally connected to the sliding head or plunger 51, which is guided in a straight up-and-down line in suitable ways 52 on the inner end of a curved arm or bracket 53, secured to the bed-plate. The straightening of the toggle-links 8 by the connecting-rod 7 and mechanism above described will cause the head or plunger 51 to move upward and force the mold-plunger 32 upward into the mold, thereby compressing the clay or other material against the pressure-plate 23 and forming the brick or other article.

In order to prevent breakage in case the mold should be overfilled or filled with a hard substance, some yielding means should be provided, and for this purpose I have connected the lower toggle-link 8 to a saddle-block 54, mounted above the base-plate and being vertically guided by any suitable means, as by ears thereon surrounding the standards 22. Strong spiral springs 55 are interposed between the saddle-block 54 and the base-plate 1, which springs are sufficiently strong to give the desired pressure to the clay or other material in the mold, but will yield in case of excessive pressure, and thus avoid breaking the machine.

To relieve the table during its rotation of the friction of the clay or other material in the hopper or spout 50, I provide a suitable cut-off, such as the plate or knife 56, which is adapted to slide in between the top of the table 26 and the lower end of the hopper or spout 50, thus severing the column of clay and supporting the same during the rotation of the table. For actuating this cut-off I have shown the same connected to the lever 57, which is pivoted at its upper end to a bracket 58 or other suitable support and which is provided at its lower end with the stirrup or loop 59, in which works the extension 15 of the pin on the crank 12. The loop or stirrup 59 is oblong in form, as shown in Fig. 8, so that the crank-pin 15 will come into contact with only two of its sides. By this means the stirrup will be moved during a fourth revolution of the shaft 11 and then remain at rest for an equal period, and then during the next fourth of a revolution of the shaft 11 it will be moved back to its original position, when it will again remain at rest. The cut-out, it will be observed, is operated from the same crank as the ratchet-lever 14, and the parts are so arranged that by the time the ratchet-lever has reached the end of its back stroke to grip a ratchet-tooth 30 the plate 56 will have fully severed the column of clay, and it will remain stationary during half of the forward stroke of the ratchet-lever and will then be withdrawn, so that by the time the ratchet-lever has completed its forward stroke the opening in the hopper will be fully opened to permit the clay to pass down into the mold. The cut-off plate will not begin its inward movement until the ratchet-lever has completed one-half of its back stroke, thus giving ample time for the filling of the mold. In this way the rotating table is relieved of the friction of the column of clay. If desired, wearing-plates 60 may be secured to the top of the table 26, upon which the cut-off plate 59 rests during the rotation of the table.

Pivoted to the lower side of the table 26 or to the upper ends of the brackets 33 are a pair of latches 61, which are provided with two notches 62 and 63. These latches tend normally to hang in a vertical position; but when the mold-plungers 32 are entirely down they will be held slightly from the vertical position, as shown in Fig. 1, by the studs or projections 35 on the plungers. As soon, however, as the mold-plungers are moved upwardly by the head or plunger 51 to compress the clay the latches 61 will drop to a vertical position, and the notches 62 will then engage the projections 35 on the plungers. This will prevent the plungers from again dropping or at least will permit them to drop only a short distance, so that in the next forward movement of the table the plungers will be held up by these latches.

The table 26 will of course be at rest during the compression of the clay in the mold, and during this time another mold is being filled. As soon as the compression and filling are completed the mold-table is relieved of all pressure and will then be given another forward step by means of the ratchet mechanism described. This will move another empty mold into position below the hopper 50, will carry the previously-filled mold above the compressing-plunger 51, and will carry the compressed mold above the push-out or ejector rod 64. This rod lies in a vertical position and is guided in a hole or opening 65 in the base-plate 1 and in a sleeve 66, secured to the side of the bracket 53. This rod preferably is made in two sections, which are adjustably connected by means of the sleeve-nut 67, so that its length can be varied as desired or necessary. Pivotally secured to the lower section of the rod 64 is a box or block 68, which is embraced by a fork 69 in the end of one of the arms of the bell-crank lever 70, pivoted at 71 to the standard 53 or other suitable part. The other arm of the bell-crank lever is connected by means of a link 72 to the pivotal point of the toggle-links 8, or it might be connected, if desired, to the connecting-rod 7. The arrangement is such that when the toggle-links 8 are straightened to compress the clay in the one mold the push-out or ejector rod 64 will be moved upward and push the plunger 32 of the previously-compressed mold upward, thereby pushing the brick or block 73 out of the mold and into the path of a discharging mechanism or knock-off device, such as the stirrup 74. This stirrup has a slot-and-pin connection with the upper ends of arms 75, secured to the rock-shaft 20, before described. This shaft is rocked at the approximate time by the mechanism heretofore described to sweep the brick or block off the table 26 upon a suitable belt, table, or other means.

The mold-plungers 32 are elevated by the push-out rod 64 to such an extent that the projections 35 will fall into the notches 63 of the latches 61, and in this position the plungers will be held and carried until the mold has reached the position in which it must be again filled. When it reaches this position, however, the plunger must be lowered upon the abutment 41, so as to permit the filling of the mold with the required amount of material. To permit this lowering of the plunger, means must be arranged for disengaging the latches 61 from the studs or projections 35. As a suitable means for this purpose I have shown knock-off projections or stops 76, which lie in the path of movement of the latches and at such a height and in such position that they will engage the lower ends of the latches at the proper time, so that in the further forward rotation of the table and mold these latches will be disengaged from the projections or pins 35, thereby permitting the springs 46 and levers 37 to lower the mold-plungers until they rest upon the abutment 41. The knock-off stops or projections 76 may be mounted in any suitable way—such, for instance, as being bolted to the standard 42.

To insure the stopping of the table 26 in proper position to have the molds filled, compressed, and emptied, I provide indexing mechanism, that shown consisting of openings or recesses 77 in the table, which are engaged by an index bolt or pin 78. This pin may be mounted in any suitable position, and I have shown it mounted in a horizontal position on a bar 79, secured to the columns 22. It is normally pressed toward the table 26 by a spring 80, interposed between the bar 79 and a cross pin or shoulder near the inner end of the index-pin. As a means for retracting the index-pin it is provided with an opening 81, into which a wedge 82 or the like is projected at the proper time. This wedge may be actuated from any moving part of the machine, and I have shown it connected to the upper end of the toggle-links 8 by the arm 83 and connecting-piece 84. By this arrangement as the main plunger 51 nears the limit of its upward stroke the wedge 82 will withdraw the index-pin 78 from the opening 77, thus unlocking the table 26. The wedge 82 will pass up sufficiently high to bring its straight face 85 into the opening 81, so that the plunger 51 can move downwardly somewhat before the spring 80 can move the pin 78 against the table 26. This will permit the ratchet mechanism to move the table 26 to remove the opening 77 from in front of said pin, so that when the latter is permitted to move inward it will bear against the edge of the table and spring into the next opening 77 that comes along.

To permit the heating of the molds and their plungers, I core the plungers out, as shown in Fig. 3, thereby forming the passages 86 and 87, which are separated by the middle web 88, provided at its upper end with a hole or holes 89, forming a communication between the passages 86 and 87. The passages 86 and 87 at their lower ends are provided, respectively, with an inlet and an outlet, and a convenient way for securing this result is had by forming the studs or projections 35 from a tube which extends transversely through the plunger and is provided opposite the central web 88 with a block or diaphragm 90. Suitable openings 91 and 92 are formed in the tube 35 and lead to the passages 86 and 87, respectively. The projecting ends of the tubes 35 are threaded or otherwise suitably formed to receive one end of the flexible tubes or hose 93. The opposite ends of these tubes are connected to suitable nipples on the column or sleeve 25, as shown. This sleeve or column is cored out, as shown in Fig. 3, forming ports 94 and 95, respectively communicating with the hose 93 at their upper ends and having their lower ends opening out on the side face of the column 25. Surrounding the sleeve or column 25 are a pair of manifolds 96 and 97, which comprise annular castings surrounding the sleeve or column and suitably secured together, as by means of the gaskets 98 and bolts 99, in such a manner that a steam-tight joint is provided between the sleeve or column 25 and these manifolds, but which will permit of the rotation of the sleeve 25 in the annular manifolds. Each of these manifolds is provided with a channel 100, which necessarily is annular and extends entirely around the sleeve or column 25 and which will communicate with the ports 94 and 95, cored out in said column, no matter to what position this column may be rotated. Each of the manifolds is provided with a nipple 101, which is adapted to be connected by a tube or hose to any desired source. One of these manifolds—as, for instance, the upper one—has its nipple connected to a steam-boiler or other source of hot fluid, while the other of such manifolds—as, for instance, the lower one—has its nipple connected to a suitable exhaust device. The steam or the like will then enter the upper manifold and from the channel therein will pass through the cored-out port 94 in the column 25 to the hose 93, thence to the plunger, where it will circulate up through the passage 86, down through the passage 87, and back by the opposite hose 93 through the cored-out port 95 to the lower manifold, and thence to the place of exhaust. As shown in the drawings the column 25 is provided with four pairs of cored-out ports 94 and 95, leading to the four mold-plungers, respectively. If more than four molds are provided, the column will be provided with a corresponding number of pairs of these cored-out ports and a corresponding number of pairs of tubes 93 must be used. It will thus be seen that the manifolds remain stationary while the molds and their plungers rotate with the table 26 and have a connection through the rotating column 25 with these manifolds, so that the mold-plungers will at all times be provided with steam or other hot fluid. The effect of this is to heat the plungers 32, and this heat will be communicated by radiation and direct contact to the molds 29, thereby preventing the sticking of the clay to either the plungers or the molds.

It may be desirable to brace the upright part of the machine to prevent vibration. As a convenient means for this purpose the pressure-plate 23 may be provided with an arm or extension 102, (Figs. 9 and 11,) which projects in a direction opposite to the columns 22 and is connected to any suitable support or standard, such as a column 103, similar to the columns 22.

In Figs. 9, 10, and 11 I have shown a modified form of the yielding or spring mechanism, and in this modification the columns 22 are mounted in the base-plate, so that they will have a slight up-and-down movement. They are guided in this movement by perforated ears 104 on the vertical standards or castings 105, which at their upper ends are provided with suitable ways or ears 106, which guide the pressure-plate 23 in a vertical direction and prevent it from tipping. It will also be necessary to provide said pressure-plate with the arm or extension 102, projecting to the opposite side of the machine and connected to the upper end of the column 103 and guided in the manner just described. The springs 55 are interposed between perforated ears 107 on the standards or castings 105 and suitable shoulders or abutments, as the nuts 108, on the columns, so that in case of excessive pressure the pressure-plate 23 can yield upwardly against the tension of these springs. The central column 21 is also surrounded by a spring 109, interposed between the nut on the end of said column and the upper face of the pressure-plate.

The operation of the machine will be readily gathered from the foregoing description. The mold-carrying plate or table 26 is given an intermittent step-by-step movement, as described, and the molds are in succession filled with material, carried over the presser-head 51, whereby the clay is compressed, thence over the ejector mechanism, when the brick is ejected, and thence back to the place of filling. When the molds are being filled, pressed, or ejected, the table is at rest and locked by the index-pin. When the said table is being rotated, the ejector, pressure mechanism, and other parts are at rest and the column of clay is supported by the cut-off plate, so that the table is practically free from friction or strain while being rotated. The ejector mechanism and the wedge for actuating the index-pin are connected directly to the toggles for working the presser head or plunger, so that a single connection from the main crank-shaft will operate all of these parts. The ratchet mechanism for giving the step-by-step rotation to the mold-table is actuated from a crank on a vertical shaft, thereby permitting a simple, direct, and positive connection between the crank and ratchet-lever, and the cut-off is operated from the same crank. The mold-plungers are positively retracted by the lever and spring mechanism 37 and 40, so that they cannot stick, and they are prevented from falling down after being elevated by the presser-head 51 and ejector-rod by means of the latches 61; but when they come over the feed-regulating abutment these latches are knocked off, thereby allowing the plungers to drop. The plungers and mold, furthermore, are heated by the connections shown, so as to prevent sticking of the clay or other material thereto.

What I claim as my invention, and desire to secure by Letters Patent, is—

1. In a brick molding and pressing machine, the combination with a frame, of a rotating mold table or plate, molds and plungers therefor carried by said table, a feed-regulating abutment at one side of the machine upon which the mold-plungers rest while the molds are being filled, a lever connected to said abutment, a screw-threaded rod swiveled to the outer end of said lever, and a swinging nut with which such rod engages.

2. In a brick molding and pressing machine, the combination with a rotating mold table or plate, of molds carried thereby, vertically-movable plungers in said molds, latches suspended from the table and arranged to engage said plungers, and means for releasing said latches.

3. In a brick molding and pressing machine, the combination with a rotating plate or table, of molds carried thereby, vertically-movable plungers in said molds, latches for engaging said plungers, a feed-regulating abutment upon which such plungers rest while the molds are being filled, and means in advance of said abutment for releasing the latches from the plungers.

4. In a brick molding and pressing machine, the combination with a rotating mold plate or table, of molds carried thereby, vertically-movable plungers in said molds, slotted brackets for guiding said plungers, pins on the plungers projecting through the slots in said brackets, latches engaging said pins, and means for releasing said latches.

5. In a brick molding and pressing machine, the combination with a rotating mold plate or table, of molds carried thereby, vertically-movable plungers in said molds, pins or projections on said plungers, latches adapted to engage said pins, a feed-regulating abutment on which the mold-plungers rest while the molds are being filled, and stops adjacent to the abutment and lying in the path of the lower ends of the latches for disengaging them from the pins.

6. In a brick molding and pressing machine, the combination with a rotating mold plate or table, of molds carried thereby, vertically-movable plungers in said molds, means for actuating said plungers to compress the brick, means for further actuating them to eject the brick, latches provided with two notches for engaging the plungers and holding the same at different heights, and means for releasing said latches.

7. In a brick molding and pressing machine, the combination with a pressure-plate, of a rotating mold plate or table, molds carried thereby, vertically-movable plungers carried by said table and projecting into said molds, springs arranged to depress said plungers, and a compression-plunger adapted to engage said movable plungers to compress the clay.

8. In a brick molding and pressing machine, the combination with a pressure-plate, of a rotating mold plate or table, molds carried thereby, vertically-movable plungers carried by said table and projecting into said molds, levers carried by said table and engaging said plungers, springs arranged to act on said levers to depress said plungers, and a compression-plunger adapted to engage said vertically-movable plungers to compress the clay.

9. In a brick molding and pressing machine, the combination with a mold plate or table, of a rotating column on which it is carried, molds carried by said plate, stationary manifolds around said column and in which the latter rotates, passages cored out in the column and communicating with said manifolds, connections between said passages and the molds, and connections to said manifolds.

10. In a brick molding and pressing machine, the combination with a mold plate or table, of a rotating column on which it is carried, molds on said table, hollow plungers in said molds, two annular stationary manifolds around said column, steam connections to said manifolds, said column having cored-out passages communicating respectively with the annular manifolds, and tubes connecting said passages with the hollow plungers.

11. In a brick molding and pressing machine, the combination with a rotating mold plate or table, a vertical shaft on which it is carried, a ratchet-and-lever connection for rotating said shaft, molds carried by said table, a vertical moving compressing-plunger, toggle-links for actuating the same, a horizontal shaft having a crank or eccentric, a connecting-rod between the same and the toggle-links, a vertical shaft geared to said horizontal shaft and having a crank or the like, and a connecting-rod between the same and the ratchet-lever.

12. In a brick molding and pressing machine, the combination with a rotating mold plate or table, of a vertical shaft on which it is carried, ratchet-teeth formed on said shaft, said shaft being also provided with annular shoulders above and below the ratchet-teeth, a hollow lever pivoted around said shaft and having inwardly-projecting flanges engaging the annular shoulders on the shaft, a pawl housed in said lever and arranged to engage the ratchet-teeth, and means for oscillating said lever.

13. In a brick molding and pressing machine, the combination with a rotating mold plate or table, of molds carried thereby, compressing mechanism operating in conjunction therewith, means for rotating said table, a spring-pressed index-pin arranged to coöperate with openings in said table, and connections between the compressing mechanism and the index-pin for periodically withdrawing the latter.

14. In a brick molding and pressing machine, the combination with a rotating mold plate or table, of molds carried thereby, a compressing-plunger, toggle-links for actuating the same, a spring-pressed index-pin arranged to coöperate with openings in said table, a wedge for withdrawing said index-pin, and connections between the toggle-links and said wedge for actuating the same.

15. In a brick molding and pressing machine, the combination with a rotating mold plate or table, of molds carried thereby, means for rotating the table, an index-pin arranged to coöperate with openings in said table, a compression-plunger, means for actuating said compression-plunger, and connections between said plunger-actuating means and the index-pin for withdrawing the latter.

16. In a brick molding and pressing machine, the combination with a rotating mold plate or table, of a compression-plunger, toggle-links for actuating the same, a push-out or ejector rod, an index-pin, and connections between the toggle-links and push-out rod and ejector-pin, respectively, for actuating the same.

17. In a brick molding and pressing machine, the combination with a rotating mold plate or table, of molds carried thereby, ratchet-and-lever mechanism for rotating said table, a crank and connecting rod for actuating said ratchet mechanism, a feeding trough or hopper, a cut-off therefor, and a stirrup connected to said cut-off and embracing the crank from which the ratchet-lever is operated.

18. In a brick molding and pressing machine, the combination with a rotating mold plate or table, of a vertical shaft on which it is carried, ratchet-and-lever mechanism for rotating the same, of a compression-plunger, toggle-links for actuating the same, an ejector-rod, a rake-off mechanism, a main driveshaft, connections between the same and the toggle-links and ejector-rod for actuating the same, a vertical counter-shaft connected to the main shaft, and connections between the same and the ratchet-lever and the rake-off mechanism respectively.

19. In a brick molding and pressing machine, the combination with a suitable base, of columns supported thereon, a rotating mold plate or table, a pressure-plate above the same secured to the upper ends of said columns, standards or frames engaging said plate for steadying the same, a compression-plunger for the molds, toggle-links for actuating the same, and springs arranged to permit the plunger and pressure-plate to yield with reference to each other.

20. In a brick molding and pressing machine, the combination with a rotating plate or table, molds carried thereby, a pressure-plate above the same, guiding and steadying frames therefor, a compression-plunger for the molds, a toggle for actuating said plunger, vertical columns to which the pressure-plate is secured, and springs between the steadying-frames and shoulders on the columns to permit the pressure-plate to yield.

In testimony whereof I, the said WILLIAM C. McELHENY, have hereunto set my hand.

WILLIAM C. McELHENY.

Witnesses:
F. W. WINTER,
ROBERT C. TOTTEN.